Patented Dec. 26, 1939

2,184,325

UNITED STATES PATENT OFFICE 2,184,325

PROCESS FOR PREPARING DERIVATIVES OF HYDROFORMED NAPHTHAS AND PRODUCTS THEREOF

William J. Sweeney and Kenneth C. Laughlin, Baton Rouge, La., assignors to Standard Oil Development Company, a corporation of Delaware No Drawing. Application October 16, 1935, Serial No. 45,234

2 Claims. (Cl. 260—2)

This invention relates to the preparation of improved hydrocarbon derivatives from hydroformed naphthas and to the products obtained thereby. It relates particularly to the use, in the preparation of such derivatives, of naphtha fractions which have been prepared by hydroforming a fraction separated from a petroleum oil by a solvent having a selective solvent action on unsaturated and aromatic hydrocarbons.

It is known that petroleum distillates may be hydroformed by destructive hydrogenation at elevated temperatures and pressures to produce products essentially different from those produced by simple hydrogenation or even by destructive hydrogenation at lower temperatures. For example, the hydroformed products when used as motor fuels possess antiknocking characteristics to a much greater degree than shown by the original oils or by products of other types of hydrogenation. These hydroformed products are produced from petroleum distillates such as burning oil and gas oil and in general from petroleum oils of a boiling range including that of gasoline and extending up to about 650 to 700° F. or somewhat higher. These distillate oils are passed in vapor phase with free hydrogen over suitable catalysts at a pressure in excess of 20 atmospheres and preferably 50 to 200 atmospheres or higher and at a temperature above about 900° F. and preferably within the range of about 930 to 1050° F. with a suitable partial pressure of hydrogen and time of contact to secure a destructive hydrogenation without the formation of appreciable amounts of polymerized or coky material. The hydrogen supplied is preferably within the range of about 1,000 to 4,000 cubic feet per barrel of feed oil, the amount generally depending upon the gravity and boiling range of the charging stock. A greater proportion of hydrogen may be used with suitable variation in feed rate, temperature and pressure as is known in the art. The feed rate depends upon the reaction temperature, and other operating conditions such as the partial pressure of hydrogen and may be suitably about 1.5 to 4 volumes of oil per volume of catalyst filled reaction space per hour. The catalysts preferably comprise the oxides or sulfides of the metals of group VI of the periodic table with suitable promoters of the alkaline earth or earth oxides. Such catalysts are insensitive to sulfur poisoning and are suitably classified as sulfactive.

This destructive hydrogenation process is conveniently described as a "hydroforming" process and the liquid products thereof are identified as "hydroformed" products for the purpose of this invention and the claims.

It has now been found that improved hydrocarbon derivatives, particularly resinous products and the intermediates used in their preparation, can be obtained by subjecting these hydroformed products and distillate fractions thereof to polymerization and condensation with a variety of polymerizing and condensing agents and reagents. Particularly desirable hydrocarbon derivatives are obtained when using hydroformed products which have been obtained by hydroforming liquid fractions which have been separated from petroleum oils by means of selective solvents; i. e. solvents having the ability to separate a petroleum oil into fractions of relatively higher and lower ratios of hydrogen to carbon. The less saturated fraction, i. e the fraction of lower hydrogen content, is hydroformed. Such extracts generally have an aniline point below 100° F., and extracts having aniline points of below 50° F. are preferred. Illustrative selective solvents are liquid sulfur dioxide, phenol, acetonitrile, furfural, ortho anisidine, resorcinol diacetate, ethylene diacetate, tricresyl phosphate, triphenyl phosphate, aniline, acetone, and the like.

These hydrocarbon naphthas may be converted into resins by treatment with strong condensing and polymerizing agents, preferably with active halide condensing agents such as aluminum chloride. The naphthas may also be condensed with other reagents, preferably organic reagents such as reactive hydrocarbons and derivatives thereof, including olefines and other unsaturated hydrocarbons, hydrocarbon halides and polyhalides, preferably aliphatic dihalides having a halogen connected to the carbon atom at each end of the carbon chain of two or more carbon atoms, such as ethylene dichloride. Products of improved color may be obtained if the naphthas are given a mild preliminary treatment with a small amount, say 1 to 5%, of polymerizing and condensing agents such as sulphuric acid and aluminum chloride in order to remove components of very high and uncontrollable activity. This preliminary treatment may also be made sufficiently complete to remove substantially all olefines from the naphtha, and the remaining naphtha, consisting largely of substituted aromatic components, may then be subjected to the various treatments shown herein.

The invention will be fully understood from the following description of illustrative methods for the preparation of a number of these improved derivatives:

Example 1

A burning oil fraction boiling from 300 to 550° F. obtained by distillation of a Coastal crude is subjected to a solvent extraction treatment with liquid sulfur dioxide. The extract is separated from the sulfur dioxide and is distilled. The initial 30% distilling is separately recovered. This fraction has a density of 34.2° A. P. I., an aniline point of 39° F., a sulfur content of 0.262% by weight, and a boiling range of 294 to 468° F.

This fraction is hydroformed by passage over a sulfactive catalyst at a pressure of 3,000 lbs. per square inch, an average catalyst temperature of 984° F., and a rate of 3.0 volumes of oil per volume of catalyst filled reaction space per hour. The ratio of hydrogen to oil in the feed to the system is 2,000 cubic feet of hydrogen per 42-gallon barrel of oil.

The hydroformed naphtha thus obtained has a density of 34.3° A. P. I., an anilin point of minus 22° F., and a boiling range of 125 to 500° F. This product is separated by distillation into three fractions having the following characteristics:

| Boiling range °F | 200-275 | 275-365 | 365-419 |
|---|---|---|---|
| Percentage of total product | 10.5 | 48.2 | 20.3 |
| Gravity °A. P. I. | 46.0 | 33.0 | 25.5 |
| Kauri-butanol value percent | 62.6 | 76.8 | 78.2 |
| Anilin point °F | 17 | −37 | −33 |

The above total hydroformed sulfur dioxide extract or the fractions described or any other suitable fractions may be subjected to the polymerization and condensation reactions now to be described. These preparations are not intended to limit this invention in any way, but are presented solely for the purpose of illustrating a few representative methods for preparing the improved products of this invention.

Example 2

Add 5% of aluminum chloride by weight to a hydroformed naphtha prepared as in Example 1 and heat with stirring under reflux, removing about 50% of the naphtha as distillate. Cool the residue, hydrolyze the aluminum chloride therein by addition of an equal volume of 50% aqueous alcohol, allow to settle, and separately withdraw the upper oily layer. Distill this layer under vacuum to 300° F. at 4 mm. of mercury absolute pressure. The residue of this distillation is a brittle resin.

Example 3

In a 5 liter three-necked flask equipped with stirrer and reflux condenser are placed 1200 cc. of a 300–400° F. fraction of hydroformed sulfur dioxide extract prepared as in Example 1, 1020 cc. of ethylene dichloride and 240 g. of aluminum chloride. The reaction vessel is heated gently in a steam bath to maintain a reflux of about 1 drop per second while stirring vigorously. Reaction commences at about 118° F. The same reflux rate is maintained throughout the reaction by gradually increasing the applied heat. Reaction is continued over a period of 2½ hours until the mixture becomes quite viscous as indicated by the size of the bubbles formed by liberated hydrogen chloride gas. The temperature of the mixture at this point is 160° F. The reaction mixture is quickly poured into a beaker containing 2500 cc. of 50% isopropyl alcohol. (If the reaction is not stopped at this point a rapidly swelling, gelatinous mass is formed, from which a partly insoluble resin may be obtained.) The mixture is agitated with steam until the color change indicates complete decomposition of the aluminum chloride complex. The ethylene dichloride solution of the resin is washed several times with water, and the solvent and unreacted material are removed by vacuum distillation to a maximum temperature of 300° F. at 4 mm. pressure. There are thus obtained 937 grams of a resin having a softening point (Ball and Ring) of 158° F. and a specific gravity of 1.0286 at 60° F. The resin is soluble in tung oil, hot linseed oil, ethylene dichloride and hydrocarbon oils, and may be used directly for the production of coating compositions such as varnishes and enamels. It is insoluble in alcohol, ether, water and is not attacked by dilute acids or alkalies. The properties of the resin are controlled by the extent to which the reaction is allowed to proceed, leading finally to a high-melting resin with only partial solubility in tung oil. The resin has the property of accelerating the drying time of tung oil in the sunlight.

The hydroformed naphthas may also be condensed with aldehydes to obtain resins. This condensation may be aided by suitable catalysts such as sulfuric acid. The activity of the sulfuric acid may be controlled by the addition of weak acids, such as the water-soluble fatty acids. The following example illustrates this preparation:

Example 4

A solution containing 45 parts by volume of acetic acid, 5 parts of sulfuric acid, 25 parts of 40% formaldehyde, and 25 parts of hydroformed sulfur dioxide extract is heated to 190° F. with stirring for four hours. The reaction mixture is diluted with 400 parts of water and the oil layer is separated, the water layer is extracted with 50 parts of benzene which is then combined with the oil layer and evaporated. There is obtained as distillation residue a transparent, soft, yellow resin of very light color.

Resins may also be obtained by condensing hydroformed naphtha with olefines, diolefines and/or acetylenes, preferably by conducting the reaction in the presence of strong condensing agents such as aluminum chloride, boron fluoride, sulfuric acid, and the like. Cracked petroleum gases, and highly cracked naphthas, such as vapor phase cracked gasoline and fractions thereof, may be used as the olefine or acetylene containing reagents.

It is often desirable to activate the hydroformed extract prior to the polymerization and/or condensation step. This activation may be secured by partially cracking the extract or by other suitable means adapted to produce reactive groups, such as olefine linkages, therein. This may be accomplished by dehydrogenation or by reaction with a hydrogen replacing agent, such as oxygen or a halogen, with subsequent removal of the oxygen or halogen by deoxidation, dehalogenation, etc. Such reactive groups may also be made use of during the polymerization reaction or may be replaced by suitable treatments by other even more reactive groups for the purpose intended. For example, halogens and sulfate radicals may be introduced to form organic halide and sulfate derivatives respectively of the hydroformed fractions, and these derivatives may be thereafter hydrolyzed, replacing the introduced groups with hydroxyl groups to form complex alcohols or phenols, depending upon whether the reactive groups are attached to aliphatic or aromatic radicals.

Example 5

Ten parts by volume of a 300–400° F. distillate fraction of a hydroformed sulfur dioxide extract are stirred vigorously with 5 parts of concentrated sulfuric acid, allowing the temperature to rise to 150° F. One part of water is added and the solution allowed to cool, when the unreacted acid is drawn off. The sulfonic acids are neutralized with 30% sodium hydroxide. The resulting hot solution of sodium sulfonates is decanted from precipitated sodium sulfate and is evaporated to dryness, yielding 64% of salt-free sodium sulfonates.

Phenolic compounds may be produced by caustic fusion of the above sodium sulfonates as follows: The sodium sulfonates (900 parts) are added in 100 part portions to a fused mixture of 664 parts of sodium hydroxide and 1332 parts of potassium hydroxide in an iron pot with an iron stirrer. The temperature is raised to 660° F. after addition of all of the sulfonates. The mixture is then cooled, dissolved in water, and slightly acidified with dilute sulfuric acid. The phenolic compounds are removed by steam distillation, giving 105 parts of product which on vacuum distillation gives 90 parts of phenolic compounds, boiling at 230° F. at 15 mm. and having a refractive index $n_D^{20}$ 1.5320

The fresh distillate is almost colorless, but turns yellow on standing. Such phenols may be used as preservatives in gasoline, lubricating oils, and other hydrocarbon compositions.

The halogenated hydroformed naphthas are suitable for use as solvents, and the higher boiling products are useful as plasticizers in resin and surface coating compositions, and as agents for increasing the oiliness or load-bearing properties of lubricating oils. The halogenated products may also be sulfurized by reaction with sulfur, sulfur chloride, etc., to produce superior oiliness agents for use in lubricating oils.

Phenols may also be prepared by halogenating the hydroformed naphtha used in the above example as by contacting with chlorine at a reaction temperature. The chlorinated naphtha may also be hydrolyzed by any suitable means; for example, by heating with dilute aqueous sodium hydroxide to a temperature of about 300 to 390° C., preferably between 340 and 380° C., at a pressure of about 2000 to 4000 pounds per square inch sufficient to maintain an aqueous liquid phase.

Suitable means for preparing resins from the phenols so obtained are illustrated in the following example:

Example 6

Twenty-five parts of phenolic compounds prepared as in Example 5 are refluxed for four hours with 100 parts of 40% aqueous formaldehyde and 5 parts of ammonia. The unreacted materials are removed by steam distillation. There is obtained as distillation residue 31 parts of resin which is soluble in all proportions in benzol and in hydro solvents, and to the extent of 25% in Kahlbaum benzine at room temperature. The resin is light yellow in color.

Example 7

Five parts of phenolic compounds prepared as in Example 5 are dissolved in 10 parts of ethylene dichloride. Five parts of aluminum chloride are added and the mixture is heated under reflux for 1½ hours. A dark, brittle resin is formed, which softens at steam temperatures and is soluble in alcohol, acetone, benzene, and ethylene chloride.

Another suitable method of preparing resins from the hydroformed naphthas is by means of the sulfonamides. These may be condensed with aldehydes, suitably in the presence of acid condensing agents such as sulfuric acid. The activity of the sulfuric acid may be controlled by the addition of weak acids, such as the fatty acids which are soluble in water. The preparation of the sulfonamides and their condensation to resins are illustrated in the following examples:

Example 8

125 parts of a 300–400° F. distillate fraction of a hydroformed sulfur dioxide extract is added slowly with stirring at 25–30° F. to 175 parts of chlorosulfonic acid. After two hours, the reaction mixture is poured onto ice, and the upper layer is decanted. The lower layer of sulfonyl chlorides is washed with water and then stirred with two volumes of 22% ammonium hydroxide at 100–150° F. for three hours. The lower layer is then separated and washed with water to yield 100 parts of a yellow liquid consisting of sulfonamides.

Example 9

Ten parts of sulfonamides prepared as in Example 8 are mixed with 6 parts of acetic acid and 2 parts of trioxymethylene and heated on the steam bath until a clear solution is obtained. Three parts of a 50% solution of sulfuric acid in acetic acid are added and the mixture heated on the steam bath for five minutes. Water is then added and the upper layer decanted. The lower layer is washed with water, dissolved in methyl alcohol, filtered, and evaporated to yield 10 parts of a soft, clear, light yellow resin, soluble in alcohol, benzene and hydrocarbon oils.

Hydroformed naphthas, particularly hydroformed sulfur dioxide extracts prepared as in Example 1 above, may also be oxidized to prepare polybasic acids. The reaction may be conducted by treatment with carefully regulated small amounts of air or oxygen in vapor phase over suitable oxidation catalysts such as vanadium pentoxide. A suitable reaction temperature is of the order of 200° C. The reaction may also be conducted by subjecting the naphtha to oxidation in liquid phase with suitable oxidizing agents or oxygen containing gases. Liquid phase oxidation catalysts, such as manganese naphthenate and mercury acetate, may be used. These catalysts are preferably soluble in the hydroformed naphtha. Resins may be prepared by condensing the oxidation products so obtained, or the polybasic acid fraction thereof, with polyhydric alcohols such as glycol, glycerol and their higher homologues.

The hydroformed naphthas may also be converted into nitrates by treatment with suitable nitrating agents, such as a mixture of concentrated nitric and sulfuric acids. The nitrates may be used as explosives and as intermediates in dye manufacture. They may also be converted to amines by treatment with suitable reducing agents, such as zinc and hydrochloric acid, or by catalytic hydrogenation. The resulting substituted anilines are useful as antidetonating agents in gasoline, and as preservatives and antioxidants in gasoline, lubricating oil, and other hydrocarbon compositions including rubber.

While the above examples describe the use of hydroformed sulfur dioxide extract, the process as shown therein may be used generally for the preparation of intermediates and condensation and polymerization products from any hydroformed naphtha, including hydroformed natural and cracked petroleum distillates and fractions obtained therefrom by distillation, cracking, solvent extraction, or other suitable means, and also to fractions similarly obtained from the hydroformed products.

This invention is not to be limited to any theoretical explanations or specific examples presented herein, all of which are presented solely for purposes of illustration, but is to be limited only by the following claims, in which it is desired to claim all novelty insofar as the prior art permits.

We claim:

1. Process for preparing resins comprising bringing a naphtha fraction boiling within the range of 125 and 500° F. and having an aniline point below about 17° F., and prepared by destructive hydrogenation of a sulfur dioxide extract of a petroleum distillate with a limited proportion of hydrogen under conditions suitable for forming antiknocking motor fuels, into reaction with ethylene di-chloride by boiling the mixture under reflux in the presence of aluminum chloride until the viscosity of the mixture increases substantially, diluting the mixture with alcohol, decomposing the aluminum chloride complex with steam, washing the remaining ethylene dichloride solution with water, removing solvent and unreacted material from the washed solution by distillation under vacuum, and recovering a resin as the distillation residue.

2. Resin prepared according to the process of claim 1, said resin being soluble in tung oil, ethylene di-chloride, and hydrocarbon oils; insoluble in alcohol, ether, and water; resistant to dilute acids and alkalis; and having the property of accelerating the drying of tung oil in sunlight.

WILLIAM J. SWEENEY.
KENNETH C. LAUGHLIN.